COMPENSATED DATA TRANSMISSION

Filed March 2, 1954 4 Sheets-Sheet 1

ERWIN DONATH
WILLIAM S. KNOWLES
*INVENTORS*

*BY* Ralph K. Bonell
AGENT

ERWIN DONATH
WILLIAM S. KNOWLES
*INVENTORS*

BY Ralph K. Bonell

AGENT

ERWIN DONATH
WILLIAM S. KNOWLES
*INVENTORS*

BY Ralph K. Bonell
AGENT

COMPENSATED DATA TRANSMISSION

Filed March 2, 1954 4 Sheets-Sheet 4

ERWIN DONATH
WILLIAM S. KNOWLES
*INVENTORS*

*BY* Ralph K. Borell

AGENT

United States Patent Office 2,753,547
Patented July 3, 1956

2,753,547

COMPENSATED DATA TRANSMISSION

Erwin Donath and William S. Knowles, Princeton, N. J., assignors to Applied Science Corporation of Princeton, Princeton, N. J., a corporation of New Jersey Application March 2, 1954, Serial No. 413,569

16 Claims. (Cl. 340—183)

This invention relates to the transmission or transfer of data and it refers more particularly to a method of and means for compensating for distortions of the data occasioned by transmitting or transferring means of a particular type.

In data-handling equipment, electrical and other quantities representing information of interest frequently must be processed so as to make this information available at a different location or different time, to change the form of representation, or for a combination of reasons. In these operations distortions or changes in value of the data may be introduced. Correct interpretation or utilization of the distorted data then requires knowledge, to a suitable degree of accuracy, of the nature of the transfer characteristic of the distorting means and further requires that this characteristic have a usable form. The correction of large amounts of data through the application of a transfer characteristic thereto as an operator is in any case cumbersome and may be impossible because of variations of the characteristic with time, temperature and like uncontrollable influences, or because of the substitution of new components in the transfer means as, for example in the case of telemetry from expendible guided missiles, the use of different air-borne transmitters in different tests.

The present invention eliminates the disadvantages cited above in those cases where the transfer characteristic of the distorting means is linear and therefore characterized by only two parameters and where reference or calibration signals representing these parameters can be transmitted or transferred by said means along with the data so as to be subject to the same distorting influences. In such cases the invention provides automatic data compensation by including in the transmission path or transfer equipment a complementary or compensating component having a linear transfer characteristic which is variable, and continuously adjusting this characteristic in accordance with information carried by the calibration signals in a manner such that the overall transfer characteristic remains a constant (which may be unity) within a desired degree of accuracy. Data compensation is thus automatically effected without knowledge of the nature of the transfer characteristic of the distorting means. In carrying out this procedure, the original or true values of the calibration signals are made available in suitable form at the receiving apparatus and compared with the values of the received calibration signals to develop a pair of error signals which are utilized to adjust the transfer characteristic of the inserted variable compensating component, as to the two defining parameters thereof, thereby to bring the overall characteristic of transmission path to the selected constant value. In the reduction of the error signals to zero, the received values of the calibration signals themselves are varied so that the method is one of successive approximations, or, from another viewpoint, one of servo loop operation. As such, the characteristics of the comparison means do not directly affect the accuracy of the compensation.

The adjustment of a linear characteristic by manipulation of two points thereon is illustrated, graphically, in Fig. 1, where variation of the positions of points A and B along lines A'A'' and B'B'', respectively, can be utilized to determine any straight line that can be drawn in the plane of the paper. Alternatively, adjustment of the position of one point and the slope of a line drawn therethrough accomplishes the same purpose.

Any number of data channels multiplexed for transmission over or transfer by a common path or passing through a common distorting environment can be controlled in the described manner by the use of a single pair of calibration channels. The compensation provided may be applied either to the composite multiplex signal or individually to the several channel signals after separation.

In the detailed description of the invention given herein a system of telemetry such as may be used in guided missle tests is referred to but the means and method of operation disclosed obviously have wider application.

It is an object of the invention to provide, in data processing equipment, means compensating for the effect of a distorting element having a linear transfer characteristic.

It is another object to provide compensating means of the above character which includes means, operatively related to the data, having a linear transfer characteristic, together with means for adjusting two parameters of said characteristic.

It is another object to provide compensating means of the above character which includes means effecting a continuous comparison between a pair of original and corresponding distorted data values.

It is another object to provide a compensated multiplex data transmission or transfer system wherein compensation for linear data distortions is provided by adjustable linear transfer means adjusted in accordance with measured distortion of a pair of calibration signals transmitted over said system.

It is another object to provide a multiplex system of the above character wherein said compensating transfer means includes a compensating element common to all channels of the system.

It is another object of the invention to provide a multiplex system of the above character wherein said compensating transfer means includes compensating elements individual to the several channels, including the channels transmitting said calibration signals.

It is a further object to provide a method for the compensation of linear data distortion.

Other objects and advantages of the invention will be apparent upon consideration of the following specification and of the appended drawings in which.

Figure 2:
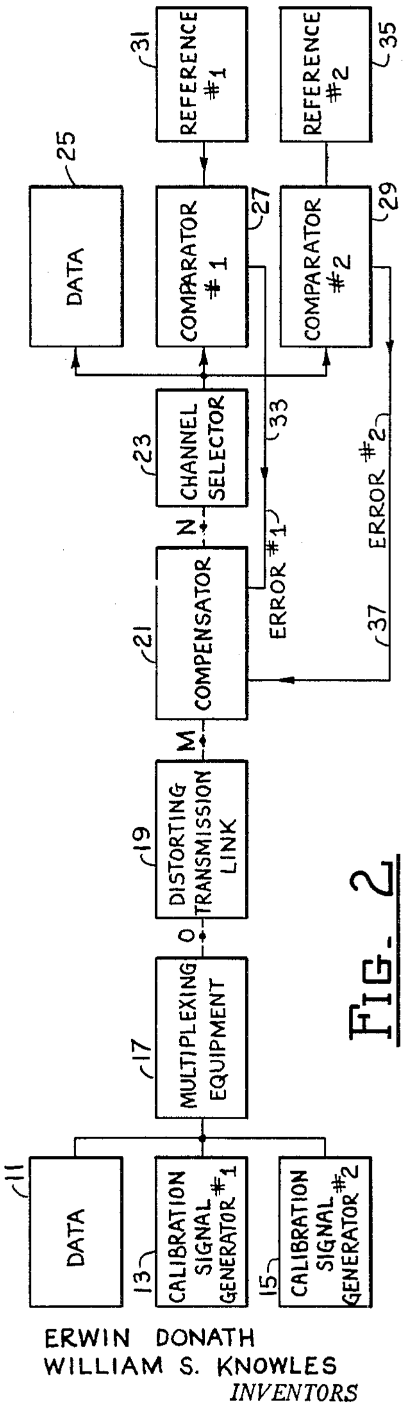
Fig. 2 shows a circuit, in block diagram form for carrying out compensation of transferred data in accordance with the principles of the invention.

Fig. 2 shows in block diagram form one embodiment of the invention. A source of data 11 and two sources of calibration information, 13 and 15 are connected to multiplexing transmitter 17, which combines the signals of the three channels and puts out a composite signal suitable for transmission over transmission link 19. The transmitted calibration information may, for example, be the zero and full scale values of the data, although the two values selected are immaterial. Multiplexing may be accomplished by any of various known methods, dependent, in part, upon the type of signals supplied by the several sources. Commonly employed methods are: frequency division and time division, the latter involving the use of switching means which connects the several sources in repeated sequence to the common transmission link.

Transmission link 19 has a linear transfer characteristic, that is, the output is a linear function of the input and it is assumed that this characteristic may be subject to variation, as to the two defining parameters thereof.

What is here termed a "transmission link" may include a combination of means in the transmission path succeeding the sources of data.

In the receiving apparatus, compensator 21 also has a linear transfer characteristic and includes means, later described, whereby this characteristic may be continuously adjusted. Thereby, the overall transfer characteristic between points O and N may be automatically compensated for uncontrollable variation of the characteristic between points O and M.

Channel separating or selecting means 23 selects the individual channel signals from the received composite signal. Data signals are routed to data circuit 25 while calibration signals originating at sources 13 and 15 are routed to comparators 27 and 29, respectively. Circuit 27, in addition to the input calibration signal received from selector 23, is supplied with a reference signal from circuit 31 and the comparator puts out on lead 33 an error signal proportional to the difference between the two inputs thereto, which is applied to compensator 21. Comparison or subtraction circuits operating on a variety of types of signals are available, examples being later referred to herein.

In a similar arrangement, comparison circuit 29 receives as inputs a calibrating signal for selector 23 and a reference signal from circuit 35, the latter having a value different from that of the signal supplied by circuit 31. The error developed in circuit 29 also is transmitted to compensator 21, over lead 37.

Compensator 21 may take a variety of forms and may include functions other than compensation. Thus, in the application of one of the present inventors, William S. Knowles, for "Signal Translator," Serial No. 413,570, filed concurrently herewith, the function of compensating for data distortion is combined with the function of translating the data from pulse duration modulation (PDM) to amplitude modulated D. C. form. Circuit means are disclosed therein whereby in a Miller integrator or Phantastron-type circuit the value of the voltage at the start of the period of linear "run-down" of output voltage, with time, is controlled in accordance with one calibration signal and the slope of the "run-down" characteristic is controlled in accordance with another calibration signal, this "run-down" providing the adjustable transfer characteristic of the translator, which concurrently serves as a data distortion compensator of the type adapted to form a component of the present invention.

Figure 5:
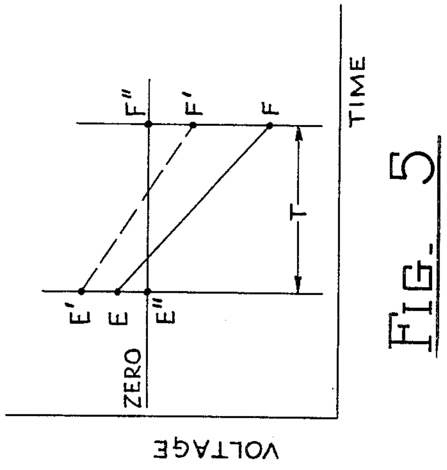
Fig. 5 is a diagram, for purposes of explanation.

Fig. 5 of the present application illustrates the operation of the means described in detail in said co-pending application. PDM input signals have a duration measured along the time axis while D. C. output signals have a magnitude measured along the voltage axis from a voltage reference designated "zero," as T and F″F respectively. By moving the origin of run-down E, for example to E′, and changing the slope of EF to that of E′F′, the output voltage corresponding to an input signal of duration T is changed from F″F to F″F′ and output signals of other durations are altered proportionally. It is again noted that the use of the position of one point and the slope as the parameters of a line is equivalent in every respect to the use of the positions or coordinates of two points.

Figure 3:
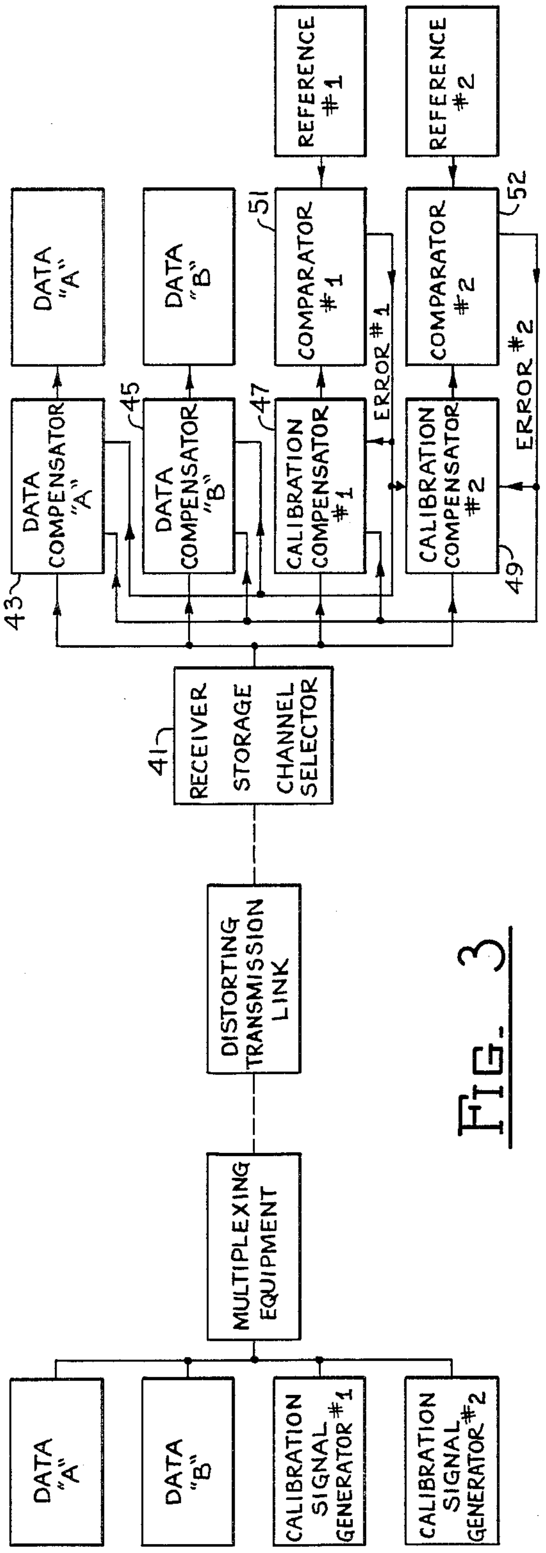
Fig. 3 shows a circuit, likewise in block diagram form, which is a modification of the circuit of Fig. 2.

Compensation may be effected by operating either on the composite signal before channel separation, as illustrated in Fig. 2 or by operating on the channel signals individually, as shown in Fig. 3. In the latter figure two data channels, "A" and "B," and two calibration channels are shown in a multiplex system. The system is similar to that of Fig. 2 up to a point on the output side of receiver 41, which component is captioned as providing signal storage facilities, thereby referring to the recording and later utilization of the composite signal described in said application Serial No. 413,570 which may also introduce linear distortion, compensated for as described. After receiver 41 the branching signal paths each includes a compensator, 43, 45, 47, 49, respectively, and each compensator is adjusted by the error signals developed in comparators 51, 52 respectively.

Operation of the arrangements of Figs. 2 and 3 is similar. If a received calibration signal does not have the value of the selected reference, the error signal changes the position of one point on the transfer characteristic of the compensator or compensators to which it is applied to reduce the error to zero. A similar process adjusts the position of a second point or the slope of the linear characteristic. Where the compensator is in the common transmission path all channel signals are compensated together, including the calibration signals (Fig. 2). Otherwise separate compensation of the individual channel signals, including the calibration signals, is provided (Fig. 3).

Figure 4:
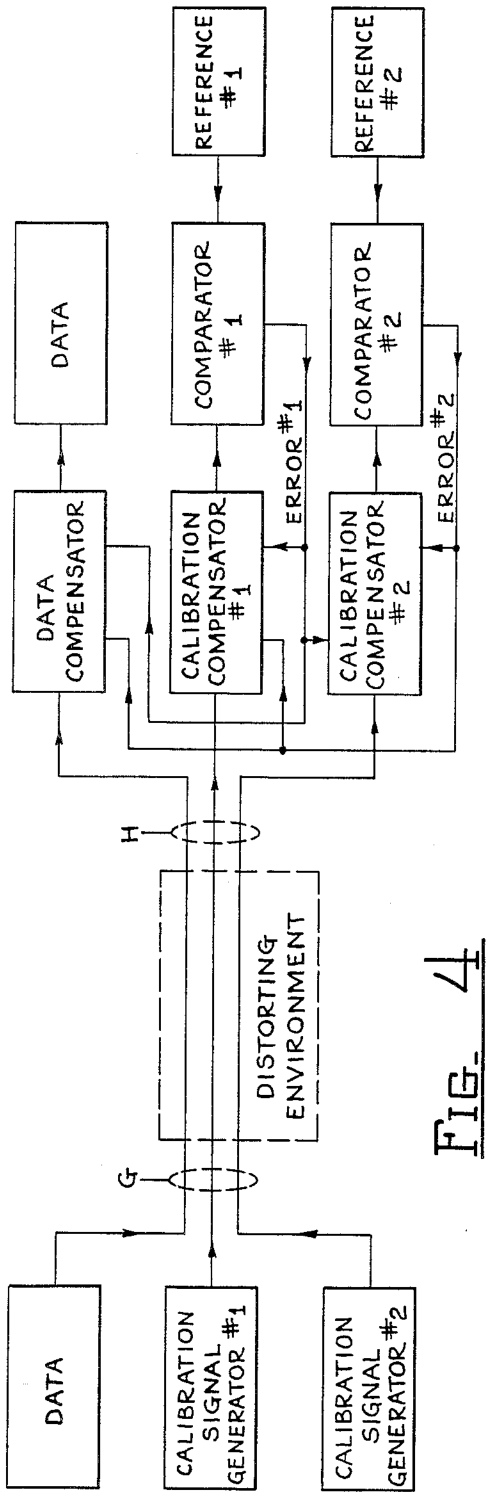
Fig. 4 shows a further modification of the circuit of Fig. 2.
Figure 1:
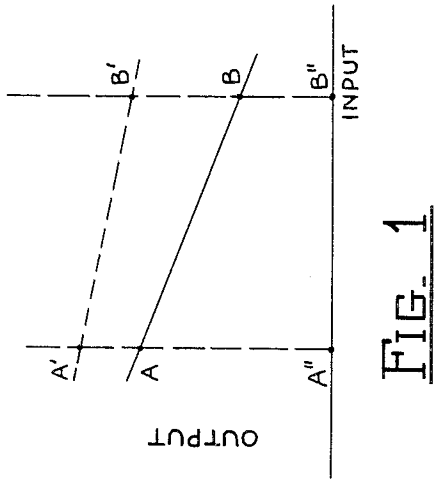
Fig. 1 is a diagram, for purposes of explanation.

Fig. 4 illustrates an application of the invention in the case where, instead of being transmitted over a common distorting link, the several channels are subject to a common distorting environment, as where a multi-conductor cable is subject to variation of temperature, leakage, etc. Provided the transfer characteristic between points G and H is linear to a required degree, the method and means of the invention can be made use of to effect compensation of the distortion introduced.

Figure 6:
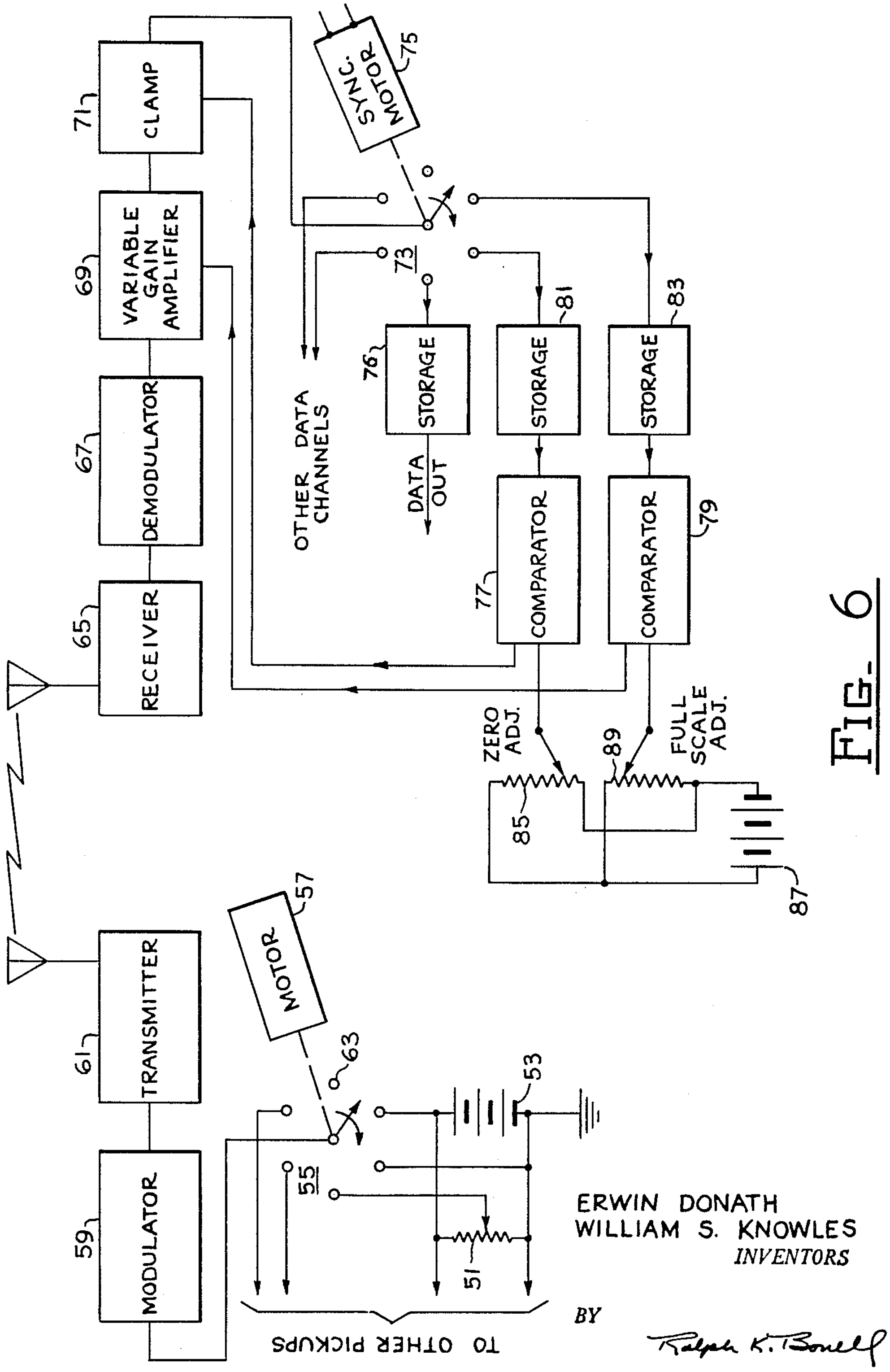
Fig. 6 shows a circuit, partly in block diagram form, of a multiplex telemetering system incorporating the compensating means of the invention.
Figure 7:
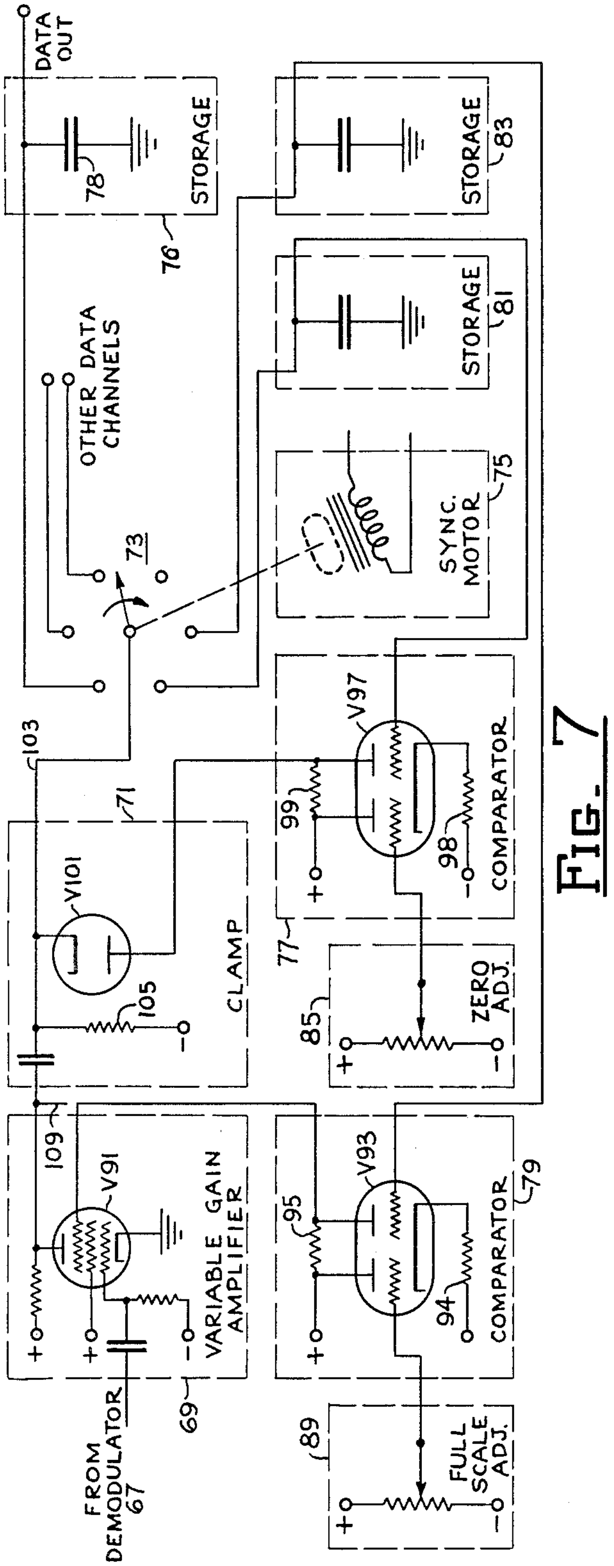
Fig. 7 is a detailed diagram of a portion of the circuit of Fig. 6.

A specific illustration of the adaptation of the compensating method and means of the invention to a radio telemetry system is shown in Figs. 6 and 7. The type of system illustrated is one wherein the signals which modulate the high-frequency carrier are in the form of pulse amplitude modulated (PAM) D. C. signals. Means constituting one data channel and two calibration channels are shown. Referring, first, to Fig. 6, a potentiometer pick-up 51 excited by battery 53 generates an output D. C. voltage in accordance with the value of the physical quantity whose variation actuates the potentiometer slider. The calibration signals used are zero and full-scale values of the data (the latter represented by full battery voltage), and are obtained by connections to the negative (ground) and positive terminals, respectively, of battery 53. Data and calibration signals are multiplexed, according to the method of time division, by connection to the contacts of rotary switch 55 driven by motor 57. The composite signal thus obtained modulates a high-frequency carrier in modulator 59 which is radiated by transmitter 61. One contact, 63, of switch 55 is left blank to provide a null signal serving as a time reference within each switching cycle and which may also serve as a synchronizing signal.

The composite H. F. signal is received and demodulated by receiver 65 and demodulator 67, respectively. The recovered L. F. composite signal would be similar in component values to the input to transmitter 61 were it not for the distortion occasioned by previously operating components of what has hereinbefore been referred to as the "transmission link," this term including all components common to the paths of the several channels. The distorted L. F. composite signal output of demodulator 67 is applied to variable gain amplifier 69 and clamping circuit 71, in that order, which two circuits jointly constitute the distortion compensating means referred to in connection with other figures, each providing for the adjustment of one parameter of the transfer characteristic. Compensating components 69, 71 operate on the signals of all channels, including the calibration channels, as in Fig. 2.

Rotary switch, 73, driven by motor 75 in synchronism with switch 55, in this case is the channel selection device routing the signals of the illustrated data channel to storage means 76, which holds the applied signals, particularly during discontinous occurrences thereof, as a D. C. voltage.

The two calibration signals are routed by switch 73 to comparators 77 and 79, respectively, by way of storage circuits 81 and 83, respectively. Comparator 77 is supplied with an adjustable constant amplitude reference signal from zero adjustment potentiometer 85, excited from a D. C. source shown as battery 87. It is to be noted that zero received signal value, in general, is not represented by zero voltage. Full scale adjustment potentiometer 89, which may be excited from the same or another D. C. source, supplies a second adjustable constant amplitude reference signal to comparator 79. The error voltage developed by comparator 79 controls the gain of amplifier 69 while that developed by comparator 77 controls clamping circuit 71, of conventional form.

Details of the circuits following demodulator 67 are shown in Fig. 7. The principal component of amplifier 69 is a remote cut-off pentode V91 whose gain is inversely proportional to the potential of the suppressor grid, other grids being suitably biased. Comparator 79, which supplies this potential, comprises dual triode V93 the grids of whose two sections receive the full scale calibration signal and the full scale reference voltage supplied by potentiometer 89, respectively. The two tube sections have a common cathode and a common cathode resistor 94. The plate circuit of the right-hand section includes resistor 95. Comparator 77, comprising dual triode V97 is of similar form and includes cathode resistor 98 and plate resistor 99. Comparator 77 develops a D. C. voltage which is applied to the plate of diode V101 in clamping circuit 71, the cathode of which is connected to signal lead 103 and receives a negative bias by way of resistor 105.

In the operation of that portion of the circuit shown in Fig. 7, the signal passed by amplifier 69 is a low-frequency A. C. signal while the voltage of a charged condenser following a clamping circuit, as condenser 78 of storage means 76, represents the D. C. signal of an individual channel. The action of comparators 77 and 79 in maintaining a constant calibration is as follows: Considering, first, comparator 77, the control exercised by this component maintains a constant ratio (not necessarily unity) between the potentials applied to the respective grids of the two sections of tube V97. These sections are cathode-coupled. The reference potential applied to the grid of the left-hand section adjusts the cathode potential and so biases the right-hand section. Subject to this bias, the signal-induced potential of the grid of the right-hand section determines the plate current and the potential of the plate of that section. Under equilibrium conditions this plate potential, therefore, has a value in fixed relationship to the reference potential and which adjusts clamping circuit 71 to establish a zero value or base line for signals passing over lead 103. If a drop in the value of the zero calibration signal occurs, for instance, the plate potential in the right-hand section of V97 rises, due to the reduced current flow, and increases the positive potential applied to the plate of V101. The change of base line thus brought about is such as to increase the effective value of the calibration signal passed over lead 103 (along with the values of the other components of the composite signal) with the resultant storage of a higher D. C. signal by circuit 81 which, in turn, increases the potential of the right-hand grid of V97, to restore equilibrium. In this manner all signals are adjusted to a common reference, as to one parameter thereof.

Comparator 79, which receives the full scale calibration signal, effects a like comparison of this signal with the selected voltage supplied by potentiometer 89. A change in the potential of the plate of the right-hand section in this case instead of actuating a clamping circuit adjusts the suppressor grid bias of V91, and thereby the gain (or slope of the output-input characteristic) of amplifier 69. Thus, if the value of the full scale calibration signal received by comparator 79 drops, a higher positive bias is applied to the suppressor grid of V91 to increase the gain of that tube and so increase the value of the calibration signal, thus restoring equilibrium. In the process, the other components of the composite received signal are similarly affected. Thus, in respect to a second parameter, all signals are adjusted to a common reference. In adjusting the operation of circuits 69, 71, adjustment of the origin and slope of the transfer characteristic of a component of the common transmission link is brought about. The adjustments of the two parameters need not, and in general will not be independent of one another. The operation of one compensating means, in general, requires a readjustment of the other means so that equilibrium is reached through mutual action.

Figure 8:
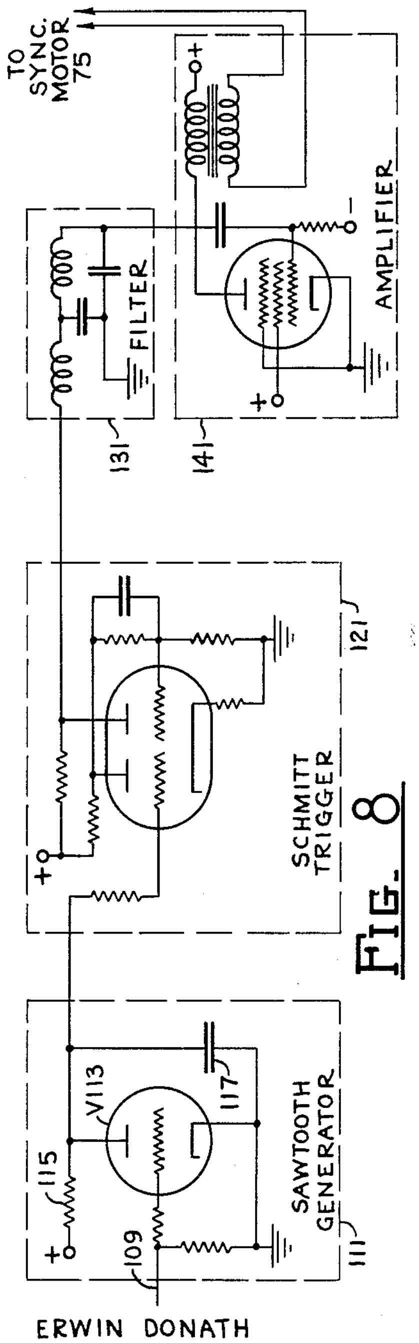
Fig. 8 is a circuit diagram of means for generating a synchronizing voltage.

The method of synchronization of the drives of rotary switches 55 and 73 depends on the relative locations of the transmitting and receiving equipment. For airborne missiles, a transmitted synchronizing signal is utilized. In the system of Fig. 6 this is the null signal, or break, transmitted when the arm of switch 55 passes over blank contact 63. Fig. 8 shows a circuit for generating, through the use thereof, an alternating voltage having a frequency corresponding to the operating speed of motor 57, for driving motor 75 of switch 73. The A. C. output of amplifier 69 is applied by way of lead 109 to sawtooth generator 111 comprising triode V113, normally biased to cutoff. During the reception of signals this tube conducts and in consequence the plate remains at a relatively low potential. Subsequently, when no signal is being received, the tube tends to revert to a cut-off condition with the plate potential rising at a rate determined by the time constant of resistor 115 and condenser 117. If this condition persists for a long enough interval, such as is provided by the break in transmission termed a "null" signal, the plate reaches a value high enough to trigger Schmitt trigger circuit 121 which supplies a well-defined pulse as an output. This is filtered by filter circuit 131 to obtain a sinusoidal wave which is amplified by circuit 141 and used to drive motor 75, in this case a synchronous motor. Thus a synchronizing frequency is made available which is independent of apparatus or transmission-medium changes.

While certain preferred embodiments of the invention have been disclosed and described herein, these are by way of illustration and not of limitation. The limits of the invention are defined solely in the appended claims.

We claim:

1. In apparatus for transferring data from a first to a second position wherein the transfer path includes a component having a variable linear transfer characteristic, means compensating for variation of said characteristic comprising a second component of said path having an adjustable linear transfer characteristic, means for generating a pair of signals representing two values of transferrable data, means for transferring said signals from said first to said second position over individual paths each having said two components in common with said first path, means materializing a pair of reference values respectively proportional to first position values of said signals, means respectively comparing second position values of said signals with said reference values to measure errors therebetween, and means for adjusting the characteristic of said adjustable component as to two parameters thereof in accordance with said errors, respectively.

2. In apparatus for transferring data from a first to a second position wherein the transfer path includes a component having a variable linear transfer characteristic, means compensating for variation of said characteristic comprising a second component of said path having an adjustable linear transfer characteristic, means for generating a pair of signals representing two constant values of transferrable data, means for transferring said signals in repeated sequence from said first to said second position over individual paths each having said two components in common with said first path, means materializing a pair of reference values respectively proportional to first position values of said signals, means respectively comparing second position values of said signals with said reference values to measure errors therebetween, and means for adjusting the characteristic of said adjustable component as to two parameters thereof in accordance with said errors, respectively.

3. In apparatus for transferring data from a first to a second position wherein the transfer path includes a component having a variable linear transfer characteristic, means compensating for variation of said characteristic comprising means for generating a pair of constant-valued calibration signals, means for transferring said signals from said first to said second position over individually branched paths, respectively, each including said variable component of the data path, compensating components having like adjustable linear transfer characteristics included, respectively, in independent branches of said data and calibration signal paths, means materializing a pair of reference values respectively proportional to first position values of said calibration signals, means respectively comparing second positon values of said calibration signals with said reference values to measure errors therebetween, and means individually and in like manner adjusting the characteristics of said compensating components as to two parameters thereof in accordance with said errors, respectively.

4. Apparatus as claimed in claim 3 wherein the means for transferring said calibration signals from said first to said second position includes means for multiplexing the data and calibration signals to obtain a composite signal for transfer through said common component of said paths.

5. In apparatus for transferring data from a first to a second position means constituting three transfer paths between said two positions having like linear transfer characteristics subject to like variation, first position sources of data and of two unequal constant-valued calibration signals, respectively, means applying signals from said sources to said paths, respectively, for transfer to said second position, second position data receiving means, means comparing first and second position values of said calibration signals, respectively, to develop a pair of error signals upon disagreement therebetween, and compensating means effective similarly to adjust parameters of said transfer characteristics in accordance with the values of said error signals, respectively, said last means including a component having a linear transfer characteristic adjustable as to the parameters thereof through the application of said error signals to said component.

6. Data transfer apparatus as claimed in claim 5 wherein said data and calibration signals are electrical signals and said several variable characteristic transfer paths comprise separate conductors of an electrical cable.

7. Data transfer apparatus as claimed in claim 5 wherein the parameters adjusted by said compensating means are the slope of and the position of a point on each of said variable characteristics.

8. In a system of multiplex telemetery means constituting a data channel and a pair of calibration channels, said several channels comprising a common component having a variable linear transfer characteristic, means for transmitting a pair of calibration signals over said calibration channels, respectively, means comparing corresponding original and transmitted values of said signals, adjustable means simultaneously and in like manner affecting the overall transfer characteristics of all said channels by altering the values of two parameters thereof, and means actuating said last means to control the values of said parameters in accordance with the two errors measured by said comparison means, respectively.

9. In a system of multiplex telemetery the combination of a transmission link common to all channels, said link having a linear transfer characteristic subject to variation, and means for maintaining a constant transmission characteristic for said system including means for generating and transmitting over individual channels a pair of constant-valued calibration signals, variable transmission means operative to modify transmission over the several channels in like manner, said last means effectively inserting a linear transfer characteristic adjustable as to slope and the position of one point thereon in the overall characteristic of all channels, and means adjusting said parameters in accordance with the differences between transmitted and received values of said calibration signals, respectively.

10. The method of effecting compensation of data transmitted over a path including a link having a variable linear transfer characteristic which comprises generating a pair of constant-valued calibration signals, transmitting said signals over said link, measuring the respective differences between transmitted and received values thereof, and varying the transmission characteristics of a portion of said path not including said link but which transmits both said data and said signals to reduce said differences.

11. In a system of multiplex telemetery wherein means are employed for maintaining constant transmission characteristics with variation of the linear transfer characteristic of a component common to all channels thereof the combination of means constituting a data and a pair of calibration channels, said data channel including in the receiving apparatus thereof a variable gain amplifier and a clamping circuit, means for transmitting data over said data channel, means for transmitting a pair of constant-valued calibration signals over said calibration channels, respectively, means for comparing transmitted and received values of said calibration signals, respectively, to develop error signals, means for varying the gain of said amplifier in accordance with one error signal and means for varying the clamping voltage of said clamping circuit in accordance with the other error signal, whereby the slope and the position of one point on the transfer characteristic of said data channel may be controlled.

12. Constant transmission means as claimed in claim 11 wherein each of said calibration channels likewise includes the combination of variable gain amplifier and clamping circuit adjusted by said error signals, respectively.

13. In a system of multiplex telemetery, a data signal source and sources of two calibration signals, time-division multiplexing means for applying said several signals in repeated sequences to a common transmission link having a variable linear transmission characteristic, channel separation means following said link, received data utilization means supplied by said last means, means furnishing a pair of reference voltages corresponding respectively to said calibration signals, means comparing said reference voltages and received values of said corresponding calibration signals to develop a pair of error signals, adjustable means defining reference levels for all received channel signals, adjustable means determining the respective gains of all channels, and means for controlling said last two means in accordance with said error signals, respectively.

14. Multiplex telemetery means as claimed in claim 13 wherein said common transmission link includes means for modulating a high frequency carrier in accordance with the signals applied as inputs to the several channels.

15. The method of automatically effecting compensation of data transmitted over a path including a link having a variable linear transfer characteristic which comprises generating a pair of constant-valued calibration signals, transmitting said signals over said link, measuring the respective differences between transmitting and receiving values thereof and providing a pair of signals which are dependent upon said differences, and varying the transmission characteristics of a portion of said path not including said link but which transmits both said data and said signals under control of said pair of signals to reduce said differences.

16. The method of automatically effecting compensation of data transmitted over a path including a link having a variable linear transfer characteristic which comprises generating a constant-valued calibration signal, transmitting said signal over said link, measuring the difference between transmitting and receiving values thereof, and varying the transmission characteristics of a portion of said path not including said link but which transmits both said data and said signal to reduce said difference.

References Cited in the file of this patent

UNITED STATES PATENTS

| | | |
|---|---|---|
| 2,039,404 | Green | May 5, 1936 |
| 2,498,306 | Stedman et al. | Feb. 21, 1950 |
| 2,656,523 | Hodson et al. | Oct. 20, 1953 |
| 2,663,855 | Beggs et al. | Dec. 22, 1953 |